Sept. 15, 1931. H. E. RUPP 1,823,630
THERMOELECTRORESPONSIVE DEVICE
Filed May 20, 1926
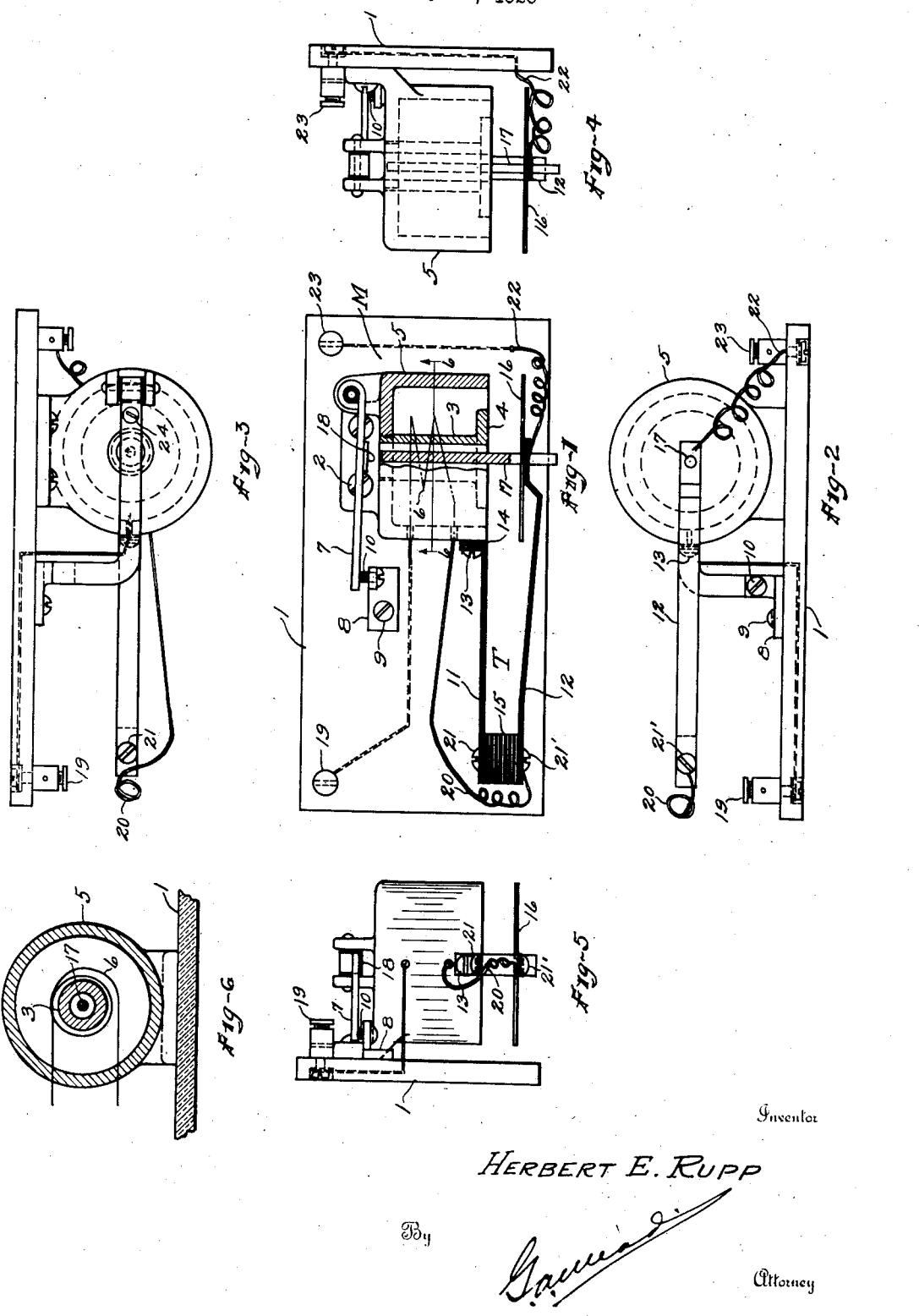
Inventor
HERBERT E. RUPP
By
Attorney Patented Sept. 15, 1931

1,823,630

UNITED STATES PATENT OFFICE

HERBERT E. RUPP, OF MANSFIELD, OHIO, ASSIGNOR TO THE OHIO BRASS COMPANY, OF MANSFIELD, OHIO, A CORPORATION OF NEW JERSEY

THERMOELECTRORESPONSIVE DEVICE

Application filed May 20, 1926. Serial No. 110,412.

My invention relates to a thermally controlled relay which may be used in various ways for various purposes, as for instance, to open and close an electric circuit or to mechanically trip some device.

The object of my invention is to provide a thermally controlled relay which is affected by the flow of current therethrough for a lapse of time, and which will operate to perform useful work and which is practically unaffected by changes in temperature of the surrounding air.

My invention resides in the new and novel construction, combination and relation of the various parts herein described and shown in the accompanying drawings.

In the drawings:

Fig. 1 is a plan view of my invention in partial section.

Fig. 2 is a bottom edge view of Fig. 1.

Fig. 3 is a top edge view of Fig. 1.

Figs. 4 and 5 are side views of Fig. 1.

Fig. 6 is a partial view in section taken on the line 6—6 of Fig. 1.

In the preferred embodiment of my invention I show a base member 1 upon which is mounted by means of the screws 2 a relay M. This relay comprises an iron core 3 having an enlarged base or end 4 and the other end being threaded for attachment to the cup-shaped member 5, also of iron. The end faces of the members 4 and 5 constitute the two poles of a magnet. Surrounding the member 3 is a coil 6 of the proper number of turns to give the desired energization of the electro-magnet when the proper amount of current is flowing.

Pivotally mounted to the member 5 or to the base 1 is a lever 7, which is shown as insulated from the member 5. This lever is composed of a conducting material preferably, such as bronze or copper, or if weight is a factor it may be composed of aluminum.

Also mounted on the base 1 is a contact standard 8 secured thereto by a screw 9 and having an adjustable screw 10 to engage with the lever 7. The lever 7 is shown as held against the screw 10 by means of gravity, but a spring can be used, if so desired, as is well known by those skilled in the art.

Mounted upon the base, or upon the member 5 as I have shown, is the thermo-responsive device T. This device comprises the upper member 11 and a lower member 12 composed preferably of two metals and known in the trade as bi-metal, such as steel and brass, and which have different temperature coefficients.

The member 11 has one end secured to the member 5 by means of the screw 13, and I have shown the same as insulated therefrom by the insulating washer 14. Secured to the free end of the member 11 is a light insulating member 15 and secured to this member is the bi-metallic element 12.

On the free end of the element 12 is mounted a soft iron disc or armature 16. The member 16 is made light so as to reduce the weight upon the thermal element 12, and its distance from the face of the magnet can be varied by bending the elements 11 or 12 or both.

Secured to the disc 16 is a light pin 17 adapted to engage with the lever 7 when the free end of the element 12 is sufficiently raised as when attracted by the electro-magnet. Since the member 7 may be used as a switch member, I place a small insulating disc 18 to be engaged by the member 17. The lower end of the member 17 passes freely through an opening in the end of the member 12 and moves independent of the member 12 under some conditions described.

By using the two bi-metallic elements as shown it will be apparent that if the brass or copper, which may compose one of the metals of these elements, is placed on the lower side that if the temperature of the element 11 is raised that the free end of the same will be raised, and the insulating member 15 instead of having its upper and lower faces horizontal as shown, they will take an oblique position with the right side lower than the left side. This would tend to throw the free end of the member 12 downward or change its relation to the face of the electro-magnet, but since the thermal element 12 has its lower metal of copper the tendency will be, since it would be affected by the same increase in temperature as the member 11, to move its free end upward.

By properly adjusting the size of the members 11 and 12 the distance of the armature 16 from the face of the electro-magnet can be maintained fairly constant regardless of any change in temperature of the surrounding air as long as both thermal elements 11 and 12 are affected by the same change in temperature.

One end of the coil 6 is secured to the attaching post 19 and the other end is secured to the conductor 20 which is secured to the fixed end of the member 12 by means of the screw 21.

To the free end of the member 12 is a conductor 22 connected to the post 23, and this conductor is very flexible adjacent the member 12 so as not to interfere with its free movement. It will be noted that the coil 6 is in series with the thermo-element 12, and in operation it is the intent that the current in a given circuit which is to be protected will pass through the coil 6 and element 12. With the members 11 and 12 properly proportioned as to length, etc., so as to give the thermal characteristics desired, and with the member 16 properly spaced a certain current will be permitted to flow through the device under normal conditions and no change in the device will take place. If, however, there should be a very heavy and sudden increase in the amount of current flowing and beyond a predetermined amount, then the magnet M would be very strongly energized and the member 16 would be attracted suddenly toward the face of the magnet M, and the member 17 would contact with the lever 7 and raise the same, and this would open any circuit which might be connected to the member 8 and to the member 7 by means of the screw 24 (Fig. 3), and this circuit connected to the parts 7 and 8 might be connected to further apparatus which would open the circuit leading to the posts 19 and 23 or to controlling apparatus which would reduce the current from an overload to a normal amount.

The members 16 and 17 being free to move relative to the member 12, the member 12 will not be drawn upward when the disc 16 and pin 17 are attracted by the magnet M and the pin 17 projects down far enough not to disengage the member 12. Under a sudden and heavy surge of current the member 12 may heat enough to have its free end moved upward to its limit and the disc and pin 16 and 17 will be held in this raised position until cooled off.

Assuming another case where the device is in normal operation and the current therethrough should increase gradually and thereby heat up the parts which the device is presumed to protect, then the thermo-responsive device would gradually come into operation and the member 16 would gradually approach the face of the magnet M until it reached a position where it will be affected by the energization of the magnet M to a sufficient degree to instantly draw the armature 16 and pin 17 upward to their limit and the pin 17 will impinge sharply upon the member 7 and move it under the action of a hammer blow.

The operation of the thermo-responsive device takes place at a less current value than that required to move the armature 16 from its lowest position, therefore, it will be seen that the device has two limits of current value which it may work to, one being a sudden increase in the current value beyond a predetermined amount and the other being a slow increase in the current value until a predetermined value is reached for a given time, but the current value is less than the overload current value.

My invention can be used in connection with electrically operated translating devices which are subject to overloads and to excessive heat below the overload value by placing it in one side of the circuit and connecting the other side of the circuit, and then connecting a circuit opening device to the contacts 7 and 8 to be opened when the protective device operates thereby opening the circuit to the translating device.

It will be quite evident that the contact member 8 will be positioned to engage the lever 7 on the opposite side thereby closing a circuit in place of opening a circuit as shown when the device operates.

The lever 7 can be used to trip a rotatably operated switch, as shown in my co-pending application, Serial No. 110,411, filed May 20, 1926, which became Patent No. 1,797,367, issued March 24, 1931, if desired, and by having the armature 16 operated during the final part of its stroke purely by the action of the magnet upon the same, mechanical stress is not placed upon the light elements 11 and 12 in moving the lever 7.

Other objects than those first stated herein will appear to those skilled in the art and also modifications which may be made without departing from the scope of my invention, therefore, I wish to be limited only by my claims.

I claim:

1. A thermo-electro operated switch comprising an electro-responsive device having an energizing coil and a thermo-responsive element normally connected in series and interposed in a circuit, means to control a circuit and to be operated by the electro-responsive device and the thermo-responsive device when the current in the circuit suddenly exceeds a predetermined value and when the current of a lower predetermined value has operated for an interval of time and means to compensate for change in temperature of the surrounding air to maintain the action of the thermo-responsive device constant.

2. An electro-thermo-responsive device comprising a thermo-responsive device operable by current flowing therethrough to heat the same, the thermo-responsive device having a freely movable end, an armature mounted on the free end of the thermo-responsive device, an electro-responsive device adapted to attract the armature when the current flowing through the thermo-responsive device has raised its temperature to a predetermined amount and deflected the thermo-responsive device and the armature into the active field of the electro-responsive device.

3. An article of manufacture comprising an electro-responsive device provided with an electro-magnet, a thermo-responsive device, an armature operable by the electro-magnet only for a predetermined current flow through the electro-magnet and by the electro-magnet and the thermo-responsive device for a current flow of a lesser predetermined value than first mentioned and thermo-responsive means to compensate for changes in temperature of the surrounding air.

4. An article of manufacture comprising an electro-responsive device, a thermo-responsive device, and an armature operable by the electro-magnet only for a predetermined current flow through the electro-magnet and by the electro-magnet and the thermo-responsive device for a current flow of a lesser predetermined value than first mentioned and means to compensate the thermo-responsive device against temperature changes in the surrounding air.

5. A circuit controller comprising a switch in said circuit to open and close the same, an armature adapted to be moved into operative relation with the switch to move it to one of its positions, an electro-magnet arranged to be energized and to attract the armature and hold the switch in the position to which it was operated by the armature and a thermo-responsive element thermally affected by current flowing through the element to move the armature toward the electro-magnet.

6. An electric switch, comprising a magnet having a core member with an opening therethrough, a winding for said magnet, a thermal element in series with said winding, a magnetic armature arranged to be moved toward said magnet by said thermal element when said thermal element is heated and movable toward said magnet by the magnetic attraction thereof independently of said thermal element, a plunger attached to said armature and extending through the opening in said magnet, and a switch arranged at the end of said magnet opposite said armature and in the path of said plunger.

In testimony whereof I affix my signature.

HERBERT E. RUPP.